Patented Aug. 8, 1933

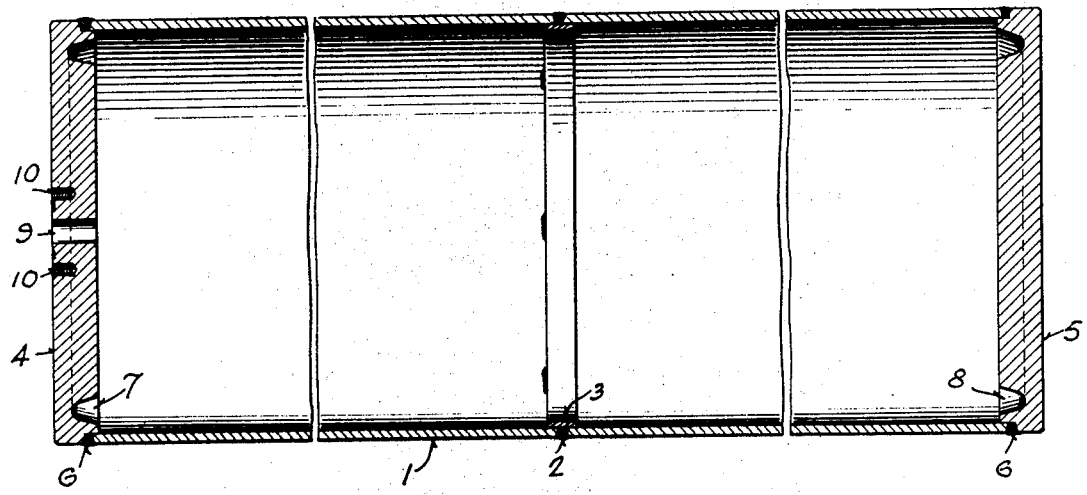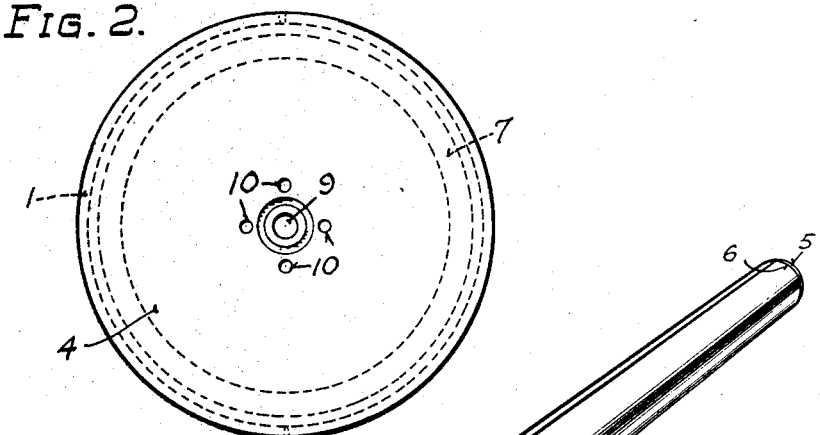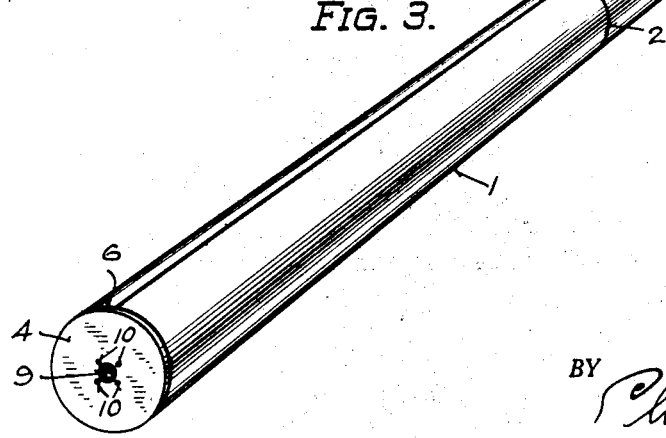

1,921,241

UNITED STATES PATENT OFFICE 1,921,241

ELECTRICALLY WELDED HIGH PRESSURE STORAGE TANK

Arthur W. Priebe, Milwaukee, Wis., assignor to A. O. Smith Corporation, Milwaukee, Wis., a Corporation of New York Application October 31, 1929. Serial No. 403,775

5 Claims. (Cl. 220—66)

This invention relates to an electrically welded high pressure storage tank.

The object of the invention is to provide a storage tank which has a maximum capacity per unit weight when employed for storing gases under high pressures.

Another object is to provide a welded cylindrical storage tank having flat end heads of a construction which will withstand high pressure without failure.

The views of the drawing are as follows:

Fig. 1 is a broken central longitudinal section of the tank.

Fig. 2 is an end view of the tank.

Fig. 3 is a perspective view of the tank.

The tank has a cylindrical body 1 formed of two long pipe sections welded end to end.

The circumferential weld 2 between the ends of the pipe sections is formed of metal deposited by means of an electric arm although the weld may be made by electric butt or flash welding.

Where electric arc welding is employed, a backing strip 3 is preferably used to facilitate the welding operation and strengthen the finished joint.

The cylindrical body is closed at the ends by means of heads 4 and 5. These heads are formed of flat stock which is preferably thicker than the metal of the tank body.

The end heads 4 and 5 are chamfered at the inner corners to allow the heads to be partially inserted into the ends of the cylindrical tank body and to provide a welding groove for receiving deposited welding metal 6. The outer corners of the heads are flush with the outside diameter of the pipe so that the deposited welding metal 6 is placed under tension stresses rather than shearing stresses by the high pressure to which the tank is subjected.

Circular grooves 7 and 8 are cut in the inner faces of the respective heads adjacent the chamfered corners thereof.

The depth of the grooves 7 and 8 is determined in accordance with the thickness of the heads and the required strength of the heads against shearing stresses set up by the high pressure to which the tank is subjected.

The thickness of the heads in the center portion thereof is determined by the strength required to resist the bending stresses set up by the pressures to which the tank is subjected.

By placing the grooves 7 and 8 adjacent the chamfered edges of the heads, as shown, the deposited welding metal 6 is allowed to contract to a limited extent, thereby relieving excessive tension stresses which may otherwise be set up by contraction of the welding metal and weaken the weld.

Furthermore, the metal of the heads between the grooves 7 and 8 and the welding grooves provides a dam against which the welding metal is deposited.

The head 4 has a central opening 9 therein and tapped holes 10 spaced around the opening for the purpose of securing a connecting pipe thereto.

The tank provided by the invention is particularly adapted for employment in the storage of gases such as helium under high pressures and it has been found that the construction herein set forth provides a tank of maximum strength for withstanding the high pressures required and of minimum weight for eliminating costs.

The limitations in size and weight which have heretofore been existant in the construction of high pressure gas containers are substantially eliminated by the present invention.

The invention may have various modifications within the scope of the accompanying claims.

I claim:

1. A high pressure tank comprising a cylindrical body, a relatively thick flat head at each end, an annular welding groove about the outer edge of each of said heads of a depth substantially equal to the thickness of the body of the tank, an annular groove in the inner face of each head forming a thin lip between said outer and inner grooves, said lip being inserted in the cylindrical body, and fused welding metal deposited in said outer welding groove between the end of the body and the head.

2. A high pressure tank comprising a tubular body, a relatively thick head at each end thereof, an annular lip projecting from the inner face of each of said heads and inserted within one end of the tubular body to form a welding dam at the bottom of a circumferential welding groove at the juncture of the head and body, and tensioned welding metal in said grooves uniting each of the heads to said tubular body.

3. A pressure storage tank comprising a cylindrical body member, a head for closing the end of the body member, the head being of substantially the same diameter as the body member and chamfered circumferentially around the inner face to so reduce it in size that it may be inserted into the end of the body member forming with the latter a welding groove, and weld metal deposited in the welding groove uniting the head and body member in such manner that when the vessel is subjected to pressure the weld is subjected to tension strains, said head having a circular groove in its inner face near its periphery to provide for relieving strains as the weld metal cools and contracts.

4. A pressure storage tank comprising a cylindrical body member, a head for closing the cylindrical body member, a circular flange formed near the periphery by chamfering circumferentially the outer corner of the head and cutting a circular groove in the inner face of the head near its periphery, the inner end of the flange being small enough to fit into the end of the cylindrical member, the cylindrical body member and the head cooperating to form a welding groove, and weld metal deposited in the welding groove uniting the end of the cylindrical body member to the head.

5. A pressure storage tank comprising a plurality of cylindrical body members welded end to end to form a tube of the desired length, heads for mounting in the ends of the tube, said heads being chamfered circumferentially of the outer corners and having circular grooves cut therein near their peripheries to provide flanges of the proper size for partial insertion into the tube, and weld metal deposited between the ends of the tube and the heads in such manner that when the body is subjected to a pressure, the weld metal will be subjected to tension strains.

ARTHUR W. PRIEBE.